W. P. Woodruff,
Piston-Rod Packing.

No. 57,243.   Patented Aug. 14, 1866.

Witnesses:

Inventor:
William P. Woodruff

UNITED STATES PATENT OFFICE.

WILLIAM P. WOODRUFF, OF NEW YORK, N. Y.

IMPROVEMENT IN PACKING FOR PISTON-RODS.

Specification forming part of Letters Patent No. 57,243, dated August 14, 1866; antedated August 9, 1866.

*To all whom it may concern:*

Be it known that I, WILLIAM P. WOODRUFF, of the city and county of New York, have invented a new and Improved Steam-Packing; and I do hereby declare that the following is a full, clear, and exact description thereof, which will enable others skilled in the art to make and use the same, reference being had to the accompanying drawings, forming part of this specification, in which—

Figure 1:
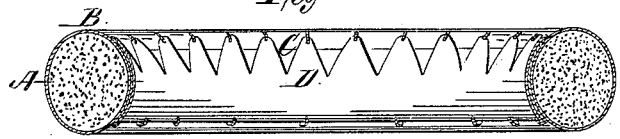
Figure 2:
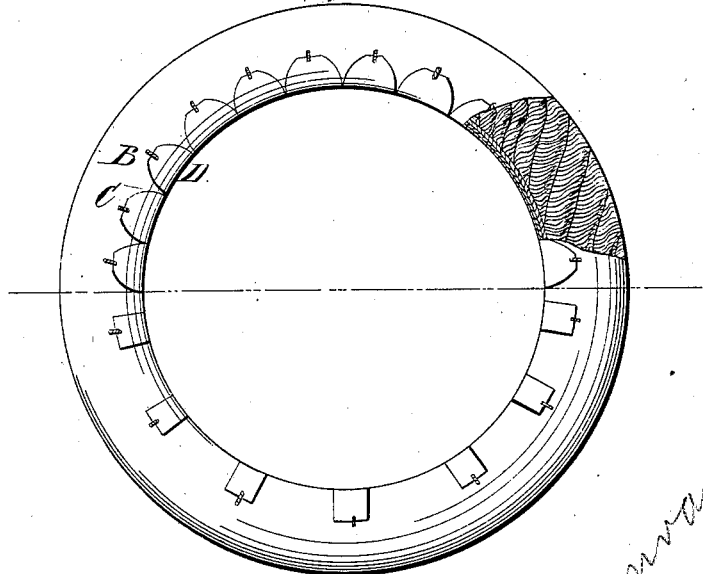
Figure 3:
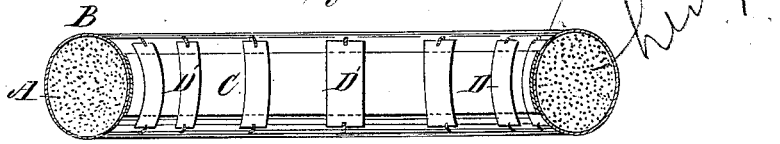

Figure 1 represents a transverse central section of this invention. Fig. 2 is a plan or top view of the same. Fig. 3 is a transverse section of a modification of the same.

Similar letters of reference indicate corresponding parts.

This invention consists in combining with a braided gasket of hemp or other textile material a canvas covering and strip of tin-foil held in position by one or more brass plates or fastenings in such a manner that by the canvas covering the gasket is fully protected and the fibers forming said gasket are prevented from working in between the piston-rod and the gland or between the joint to be packed, and by the application of the tin-foil a self-lubricating quality is imparted to the packing, whereby the friction and the wear and tear of the working parts are materially reduced.

A represents a gasket braided of hemp or other suitable textile material, and protected by a covering, B, of canvas, which is firmly sewed to it, and which prevents the gasket from unraveling, and at the same time the gasket preserves its elasticity and shape, so that the same, when introduced into a stuffing-box and exposed to the pressure of the gland, will readily spread and press steam-tight against the piston or valve rod or other piece to be packed, and also against the inner circumference of the stuffing-box.

To the inner circumference of my packing I secure a piece, C, of tin-foil, which is held in position either by a continuous strip, D, of sheet-brass, as shown in Figs. 1 and 2, or by a series of strips, D', as shown by Fig. 3.

If a continuous strip is used, it must be scalloped, as shown in Figs. 1 and 2, so that the tin-foil is permitted to come in contact with the part to be packed; or, if several strips of brass are used to hold the tin-foil in position, said strips are secured to the canvas at suitable distances apart, as shown in Fig. 3. By this arrangement the tin-foil is securely held in place and my packing is rendered self-lubricating, the tin-foil being of such a nature that it acts as a lubricator, whereby the friction between the working parts and their wear and tear are considerably reduced.

My packing is easily made in such sizes as are required, and it lasts much longer than other packings made for the same purpose, and by its use much time, labor, and expense are saved.

What I claim as new, and desire to secure by Letters Patent, is—

A steam-packing made of a gasket, A, braided or otherwise produced by hemp or other suitable material and protected by a flexible covering, B, in combination with a strip of tin-foil fastened to its inner circumference by one or more strips of brass, substantially as and for the purpose set forth.

WILLIAM P. WOODRUFF.

Witnesses:
M. M. LIVINGSTON,
W. HAUFF.